United States Patent [19]
Tate et al.

[11] Patent Number: 5,518,392
[45] Date of Patent: May 21, 1996

[54] INJECTION BLOW MOLDING APPARATUS INCLUDING STACKED MOLDS

[75] Inventors: Dennis J. Tate, Grass Lake; Ronald Pieper, Chelsea; Thomas R. Buehler, Adrian, all of Mich.

[73] Assignee: Hoover Universal, Inc., Plymouth, Mich.

[21] Appl. No.: 129,895

[22] Filed: Sep. 30, 1993

[51] Int. Cl.$^6$ ............................................. B29C 49/06
[52] U.S. Cl. .......................... 425/538; 264/523; 425/540
[58] Field of Search ............................ 425/572, 574, 425/581, 533, 534, 540, 538; 264/523

[56] References Cited

U.S. PATENT DOCUMENTS

| | | |
|---|---|---|
| 2,463,560 | 3/1949 | Rempel . |
| 3,880,560 | 4/1975 | Takahashi ............................ 425/574 |
| 4,540,543 | 9/1985 | Thomas et al. . |
| 4,604,258 | 8/1986 | Valyi . |
| 4,940,403 | 7/1990 | Hirschberger . |
| 5,062,787 | 11/1991 | Takeuchi ............................ 425/534 |

*Primary Examiner*—Tim Heitbrink
*Attorney, Agent, or Firm*—Harness, Dickey & Pierce

[57] ABSTRACT

A multi-station injection blow molding apparatus for producing hollow plastic articles, including vertically stacked preform injection molds at a first station, vertically stacked blow molds at a second station and an indexing head assembly having upper and lower core bearing indexing heads which are rotatable in a horizontal plane when the molds are open and also are movable vertically relative to and in correspondence with movement of the molds during opening and closing of the molds. In one embodiment, the movable supports which support the mating mold portions of the upper and lower injection and blow molds are coupled to the mold clamping mechanism of the apparatus through mechanical linkage which causes the upper and lower molds to be opened and closed simultaneously. In another embodiment, the movable supports are coupled together, causing the upper and lower molds to be opened and closed sequentially.

23 Claims, 4 Drawing Sheets

INJECTION BLOW MOLDING APPARATUS INCLUDING STACKED MOLDS

BACKGROUND OF THE INVENTION

This invention relates to injection blow molding apparatus, and more particularly, to an injection blow molding apparatus including stacked molds.

Various processes are used in injection molding of hollow plastic articles, and typically processes which have overlapping time cycles in order to reduce production time. One method for producing hollow plastic articles, which is commonly referred to as the Farkus method, employs vertically oriented back-to-back injection molds and blow molds. Examples of this type of injection blow molding apparatus are disclosed in U.S. Pat. Nos. 4,540,543 and 4 604,258. The apparatus includes a pair of blow molds which are arranged above and below a single cavity injection mold in a vertical plane, so that while one preform is being molded, another is being blown. Shuttle plates move the preforms vertically from the injection mold to the blow molds and from the blow molds to an ejection apparatus. The use of vertically oriented back-to-back injection and blow molds doubles the output without appreciably increasing the size of the injection blow molding apparatus. However, this type of apparatus lacks sufficient space for ejecting completed products.

Most commercial injection blow molding machines incorporate a common type of Gussoni horizontal indexing mechanism. The Gussoni apparatus includes three or more stations which are arranged in a loop, and the process moves in sequence from station to station until it reaches the initial station, and then the process is repeated. The first station, which is the preform station, includes a preform injection mold, typically having a plurality of mold cavities so that a plurality of preforms can be produced simultaneously. The second station, which is the blow station, includes a blow mold having the same number of blow mold cavities as the preform mold for blowing the preforms into hollow articles. The third station, which is the eject station, includes apparatus for ejecting the hollow articles from the apparatus. The apparatus further includes a plurality of sets of cores which are mounted on a rotating indexing head which rotates in a horizontal plane. The cores cooperate with the molds in producing the articles and move the articles from station to station during the blow molding process.

In the initial stage of the process at the preform station, one set of cores is moved into the cavities of the preform injection mold and the mold is closed and clamped. Then, hot plastic resin is injected through a nozzle into a manifold though individual nozzle tips into the cavities of the preform mold where the exact amount of material needed to form the preforms is injected around cores located in the cavities. Then, the preform mold opens and the indexing head indexes the cores carrying the injected preforms 120° to the blow mold at the second station. The blow mold closes and the preforms are blown by air to the final shape of the containers. Then, the blow mold opens and the indexing head again indexes the cores carrying the finished containers 120° to the eject station where the containers are ejected by a stripper bar either directly off the cores or into a transfer unit for orientation on a conveyor. In this type of equipment, one preform is being molded at the preform station while another is being blown at the blow station and a formed container is being removed from the apparatus at the eject station. This apparatus provides a simple way for ejecting the finished from the apparatus but is limited by in the number of product that can be produced at the same time.

SUMMARY OF THE INVENTION

The present invention provides an improved injection blow molding apparatus which includes vertically stacked multi-cavity molds, each having mating upper and lower mold portions which are adapted for relative vertical movement between closed and open positions. In accordance with a disclosed embodiment, the lower mold portion of the lower mold is supported on a fixed support and the upper mold portion of the upper mold is supported on an upper movable support. The upper mold portion of the lower mold and the lower mold portion of the upper mold are supported on a common support which is located between the fixed support and the upper support. The upper support is coupled to a motive means, such as the mold clamp mechanism of the injection blow molding apparatus, which moves the upper support vertically relative to the fixed support and to the common support to open and close the upper mold. The common support is coupled to the motive means by a coupling means which causes the common support to be moved vertically relative to the fixed support to open and close the lower mold. The common support is coupled to the motive means in a manner as to cause the lower mold to be opened and closed substantially simultaneously with the opening and closing of the upper mold. Simultaneous opening and closing of the first and second molds is provided by moving the common support vertically as the upper support is moved vertically during opening and closing of the molds and at a slower rate than the rate at which the upper support is moved. This causes the upper support to travel further than the common support during opening and closing of the molds, thereby compensating for the movement of the common support and the mold portions carried thereby.

The stacked mold arrangement is particularly suitable for use in a multi-station apparatus including injection means at a first station, blow molding means at a second station, and indexing head means which is rotatable in a horizontal plane and includes a plurality of cores. The cores cooperate with the injection means for producing preforms at the first station and cooperate with the blow molding means at the second location for expanding the preforms to form hollow articles. In accordance with one embodiment of the invention, the apparatus includes stacked molds at least at one of the stations which are adapted to be opened and closed substantially simultaneously. The indexing head means includes upper and lower rotating indexing heads which are coupled to the motive means to enable the cores to be moved vertically relative to the molds in correspondence with the movement of the molds and to be moved at different rates which are correlated with the rates at which the upper support and the common support are being moved. In accordance with another embodiment, the common support and the upper support are coupled together in a manner as to cause the upper and lower molds to be opened and closed in sequence. In both arrangements, the upper and lower molds are disposed in a vertically stacked arrangement and the upper mold and the lower mold are clamped closed by a common clamping mechanism during molding operations. Consequently, the mold capacity for the injection blow molding apparatus is doubled without an increase in the clamping tonnage for the molds.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF PREFERRED EMBODIMENTS

Figure 1:
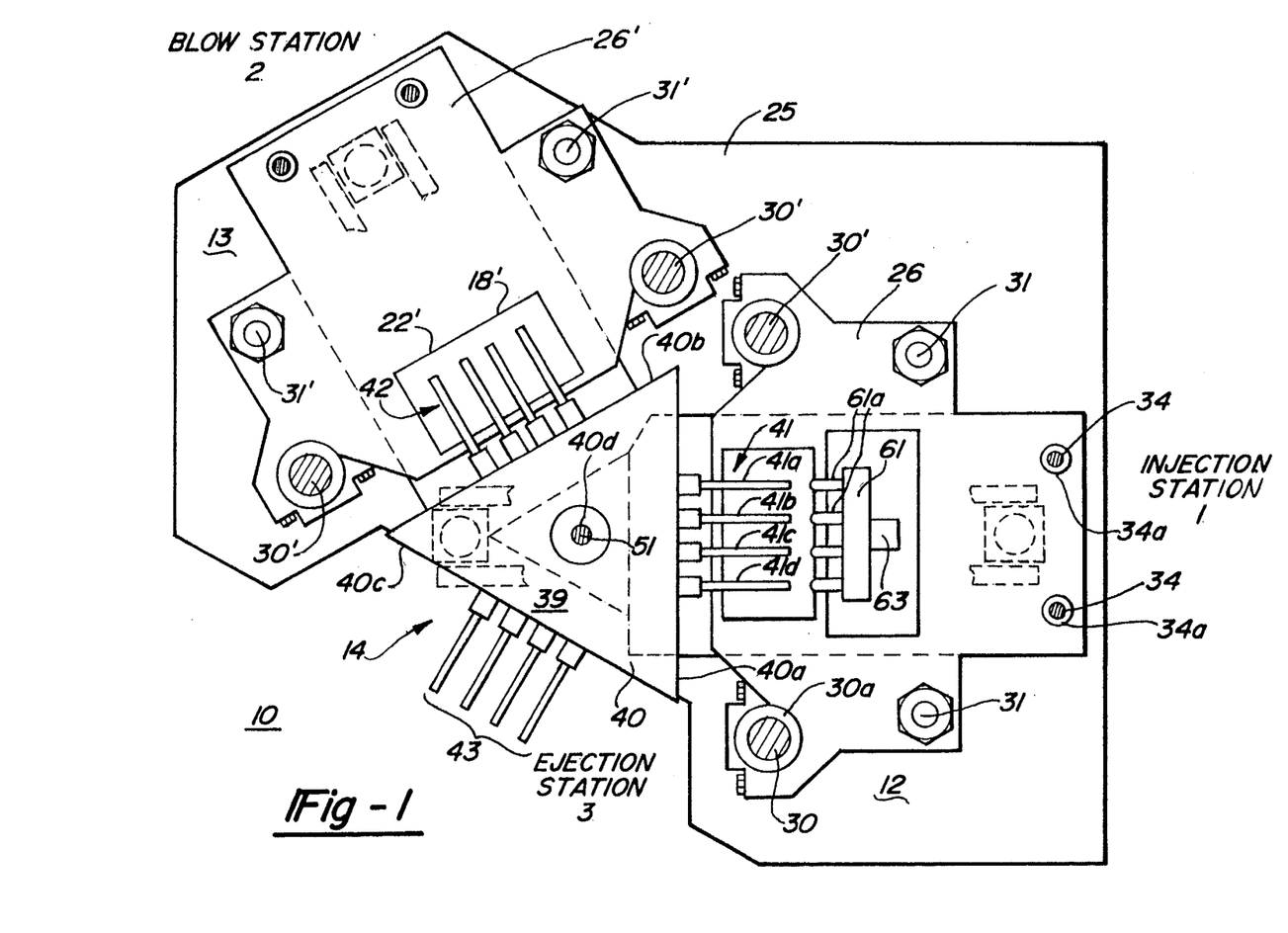
FIG. 1 is a top plan view illustrating the common shoe and the upper indexing head of the injection blow molding apparatus provided by the present invention.
Figure 2:
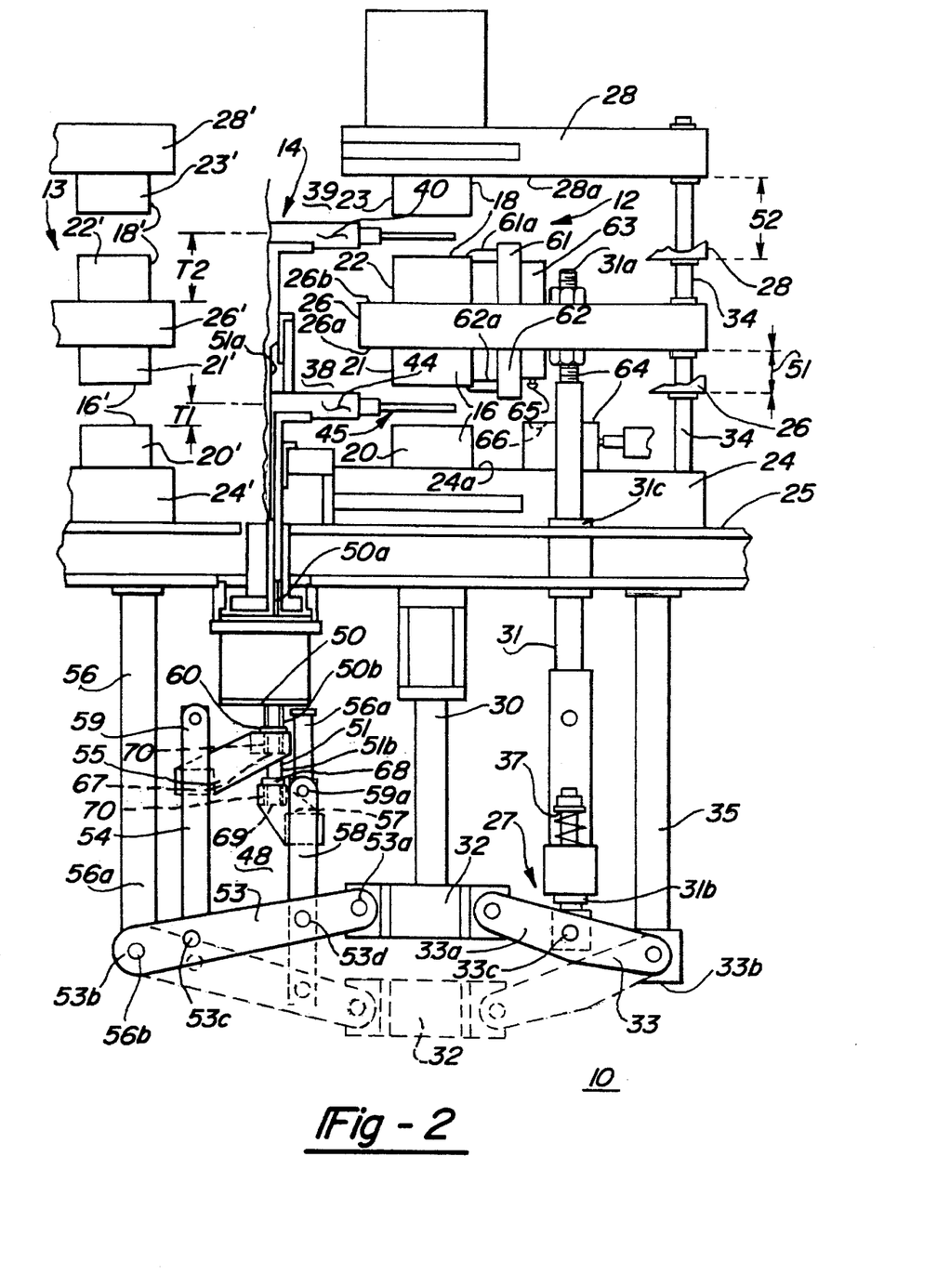
FIG. 2 is a fragmentary side elevation view illustrating upper and lower injection and blow molds, upper and lower indexing heads and the drive mechanism for the injection molds and indexing heads of the injection blow molding apparatus provided by the present invention.

Referring to FIGS. 1 and 2 of the drawings, the stacked mold arrangement provided by the present invention is described with reference to an application in a multi-station type injection blow molding apparatus for producing hollow articles. The multi-station injection blow molding apparatus includes a preform station I, a blow station II and an eject station III which are arranged in a loop. FIG. 1 is a top plan view illustrating the common shoe and the upper indexing head of the injection blow molding apparatus 10 provided by the present invention. FIG. 2 is a fragmentary side elevation view illustrating the upper and lower blow molds and injection molds, the upper and lower indexing heads and the drive mechanism for the for the injection molds and indexing heads of the injection blow molding apparatus 10.

The multi-station injection blow molding apparatus 10 includes a stacked injection mold assembly 12 at station I, a stacked blow mold assembly 13 at station II and a horizontal indexing mechanism 14. The indexing mechanism 14 includes upper and lower indexing heads, such as upper indexing head 40, shown in FIG. 2, which is rotated in a horizontal plane to index three sets of cores, such as core sets 41–43, with the injection mold assembly at station I, the blow assembly at station II and an ejection apparatus (not shown) at station III. In the exemplary embodiment, the multistation apparatus has three stations, and thus, each transfer of the indexing head moves the indexing head counterclockwise 120°.

The cores are rotated with the indexing head to move the articles from station to station during the blow molding process as is known in the art and the cores cooperate with the injection molds and the blow molds of the stacked mold assemblies in producing the hollow articles. The indexing heads raise the cores sufficiently to enable the cores to clear the molds so as to permit rotation of the indexing heads to rotate the cores to the next station. At the preform station I, hot plastic resin is injected into cavities of the preform injection molds around the cores. At the blow station II, air is blown through the cores to expand the preform to the shape of the blow mold cavity walls, producing the hollow articles. At the stripper or ejection station III, the blow molded articles are removed from the cores.

In accordance with the present invention, the preform injection mold assembly 12 and the blow mold assembly 13 each includes a stacked mold arrangement having molds disposed at upper and lower levels. Moreover, the indexing mechanism 14 of the injection blow molding apparatus 10 includes a multi-level indexing mechanism. The injection blow molding apparatus 10 includes suitable ejection apparatus (not shown) at upper and lower levels at the eject station. In addition, the injection blow molding apparatus 10 includes suitable preform mold heating means and blow mold cooling means (not shown) as is known in the art.

More specifically, the preform injection mold assembly 12 includes a lower preform mold 16 and an upper preform mold 18. The lower and upper preform molds are shown in the open position in FIG. 2. The lower mold 16 has a lower mold portion 20 and an upper mold portion 21. The upper mold 18 has a lower mold portion 22 and an upper mold portion 23. The lower mold portion 20 is mounted on the upper surface 24a of a fixed lower shoe 24 which is mounted on a frame 25 of the injection blow molding apparatus. The upper mold portion 21 is mounted on the lower surface 26a of a movable common shoe 26. The lower mold portion 22 is mounted on the upper surface 26b of the common shoe 26. The upper mold portion 23 is mounted on the lower surface 28a of a movable upper shoe 28. In the exemplary embodiment, the lower and upper injection molds each define four mold cavities. The mold portions of the lower mold 16 and the upper mold 18 are removably mounted on their respective shoes to permit tooling changes when necessary.

The upper shoe 28 is secured to a pair of vertically extending tie rod bars 30, shown in FIG. 1, in a suitable manner such as by nuts which are received on threaded upper ends of the tie rod bars. The tie rod bars 30 extend through bushings 30' on the common shoe 26 and are driven off a mold lift mechanism which is located beneath the mold assemblies and the indexing head assembly. The mold lift mechanism is connected to a bridge 32 of the mold clamping mechanism (not shown) of the injection blow molding apparatus. The mold clamping mechanism is conventional and clamps together the sections of the split injection molds and the sections of the split blow mold to maintain the molds closed during molding operations as is known in the art. The upper shoe 28 is moved by the tie rod bars 30 which are driven by the mold clamping mechanism in the conventional manner to be moved vertically upwards and downwards relative to the lower shoe 24. However, in accordance with the invention, the upper mold portion 23 mates with the lower mold portion 22 carried by the common shoe 26, and the upper mold portion 21 carried the common shoe 26 mates with the lower mold portion 20 on the lower shoe 24. The stack mold assembly 12 includes suitable guide rods 34 for insuring registry of the upper mold portions with respective lower mold portions as the upper mold portions are moved between open and closed positions for the molds. The guide rods 34 extend through bushings 34a mounted on the upper and common shoes.

The injection blow molding apparatus illustrated in FIGS. 1 and 2 provides simultaneous opening (and closing) of the lower and upper molds 16 and 18. The common shoe 26 is mechanically coupled to the upper shoe 28 by a pair of coupling mechanisms 27, one at each side of the mold assembly, to provide relative vertical movement between the upper and lower portions of the lower mold in response to actuation of the mold clamping mechanism. Each coupling mechanism 27 includes a push rod 31 and a pushrod link member 33. The common shoe 26 is supported on the upper ends 31a of the pushrods 31 which have lower ends 31b connected to the mold clamping mechanism bridge 32 through a linkage, such as a pivot link member 33. The pushrods 31 extend through bushings 31c. The pivot link member 33 has one end 33a connected to the mold clamping mechanism bridge 32 and its other end 33b connected to a pushrod pivot link support 35 which is connected to the underside of the base 25. The lower end 31b of the pushrod 31 is connected to the pivot link member 33 at a location 33c which is between the ends 33a and 33b of the pivot link member 33. The coupling mechanism 27 includes an over-limit travel spring mechanism 37 which limits downward travel of the pushrod 33 and thus downward movement of the mold portion 21 relative to mold portion 20.

In providing simultaneous opening and closing of the lower and upper molds 16 and 18, the common shoe 26 as well as the upper shoe 28 moves vertically during opening and closing of the molds. Thus, the lower portion 22 of the upper mold 18 which is carried by the common shoe 26 as well as the upper portion 23 of the upper mold moves vertically during opening and closing of the molds. To compensate for this vertical movement of the common shoe 26 and enable the upper and lower molds to reach their open positions substantially at the same time, the upper shoe 28 travels further than the lower shoe 26 during opening and closing of the molds. In the exemplary embodiment, the length of the link member 33 and the point of connection of the pushrod 31 to the link member 33 is selected to cause the upper shoe 28 to be moved twice the distance that the common shoe 26 is moved in moving the upper and lower mold portions between open and closed positions for the upper and lower molds. By way of example, the length or distance of travel S1 for the common shoe 26 between and closed positions for the lower mold 16 is five inches and the length or distance of travel S2 for the upper shoe 28 between and closed positions for the upper mold 18 is ten inches.

The arrangement of the molds for the stacked blow mold assembly 13 is similar to that for the stacked injection mold assembly 12 and the mechanism for driving the stacked blow molds between open and closed positions is substantially the same as that for the stacked injection mold assembly 12 and thus will not be described in detail. Elements of the stacked blow mold assembly that are identical with or similar to elements of the stacked injection mold assembly 12 have been given the same reference numerals with a "prime" notation. Briefly, the stacked blow mold assembly 13 includes a lower blow mold 16' and an upper blow mold 18'. Each blow mold defines four mold cavities to receive the four preforms produced by the associated preform injection mold. The lower mold portion 20' of the lower blow mold is mounted on a fixed shoe 24' which is similar to fixed shoe 24. The upper mold portion 21' of the lower blow mold is carried by the underside of an common shoe 26'. The lower mold portion 22' of the upper blow mold 18' is carried on the common shoe 26' as is shown in FIG. 1. The upper portion 23' of the upper blow mold 18' is carried on an upper shoe 28' which is similar to the upper shoe 28. Tie rod bars 30' are driven off the mold clamping bridge 32 which is connected to the blow mold clamping mechanism (not shown) in the manner of the tie rod bars 30 associated with the injection mold assembly 12 in opening the upper blow mold. Pushrods 31' which are secured to the common shoe 26' are coupled to the mold clamping bridge which is connected to the blow mold clamping mechanism (not shown) by a push rod pivot linkage (not shown) which is identical to the coupling mechanisms 27, including link members 33, for the injection mold assembly 12 and accordingly will not be described in detail. The upper and lower blow molds are moved by the blow mold clamping mechanism through the associated clamping bridge between open and closed positions simultaneously with the movement of the lower and upper injection molds 16 and 18 between open and closed positions.

The indexing mechanism assembly 14 includes a lower indexing head assembly 38 associated with the lower injection mold 16 and the lower blow mold and an upper indexing head assembly 39 associated with the upper injection mold 18 and the upper blow mold 18'. Each of the indexing head assemblies includes a plurality of cores which are mounted on an indexing head which rotates in a horizontal plane. The upper indexing head assembly 39, which is shown in plan view in FIG. 1, includes a rotatable head 40 and three sets of cores, such as core sets 41–43 shown in FIG. 1. The rotatable head 40 is triangular in shape and has three sides 40a, 40b and 40c, corresponding to the three stations of the multi-station apparatus 10. Each transfer of the indexing head 40 rotates the indexing head counterclockwise 120°. The head 40 has a center opening 40d which facilitates mounting of the head 40 to a shaft 51.

In the exemplary embodiment, each core set includes four cores, such as cores 41a–41d for core set 41, which are adapted to be moved into and out of the molds by a drive or core lift mechanism 48 which is coupled to the mold clamping mechanism bridge 32 of the injection blow molding apparatus. However, the core sets may have more or fewer cores as a function of application. The cores are attached to the indexing head 40 by suitable core rod holders and retainers as is known in the art. The lower indexing head assembly 38 is identical with the upper indexing head assembly 39 and includes a rotatable head 44 and three sets of cores, such as core set 45 shown in FIG. 2. Each core set has four cores.

The cores of the upper and lower indexing head assemblies cooperate with the injection molds and the blow molds in producing the hollow articles in the manner known in the art for a single level Gussoni type indexing system. However, in the injection blow molding apparatus 10, the upper and lower indexing heads, and the core sets carried thereby, are rotated simultaneously to move the preforms, and the articles formed therefrom, from station to station during the blow molding process as is known in the art for a single level apparatus. As the upper and lower preform injection molds and the upper and lower blow molds close, the cores settle into receiver pockets which hold the cores tightly to keep the cores from deflecting sideways and injecting an improperly formed preform as is known in the art for conventional apparatus.

During opening of the molds, a core drive or lift mechanism 48 lifts indexing heads 40 and 44 to raise the cores out of the lower mold portion while the corresponding upper mold portion is being raised until sufficient clearance is provided to permit rotation of the indexing heads 40 and 44 from station to station. Similarly, during closing of the molds, the core drive or lift mechanism 48 lowers the cores into the lower mold portion while the corresponding upper mold portion is being lowered until the cores are properly positioned within the molds.

The core drive or lift mechanism 48 includes concentric, vertically extending rods 50 and 51 and a pivoting linkage including a drive link member 53. The rotatable head 44 of the lower indexing head assembly 38 is supported on the upper end 50a of the outer rod 50. The lower end 50b of the rod 50 is coupled to the mold clamping mechanism bridge 32 through a bracket 55, a coupling link member 54 and the drive link member 53. Similarly, the rotatable head 40 of the upper indexing head assembly 39 is supported on the upper end 51a of the inner rod 51, and the lower end 51b of the rod 51 is coupled to the mold clamping mechanism bridge 32 through a bracket 57, a coupling link member 58 and the drive link member 53.

The lower end 50b of the outer shaft 50 is seated in a countersunk opening in the upper surface of a thrust bearing 60 which, in turn, is supported on the upper surface of an upper lift block 67. The inner shaft 51 extends through a bore in the upper lift block 67 and is seated near its lower end 51b in a countersunk opening in the upper surface of a thrust bearing 68 which, in turn, is supported on the upper surface of a lower lift block 69. The lower end 51b of the inner shaft 51 extends into a bore in the lower lift block 69. Each of the bores includes a bushing 70 to permit the inner shaft to rotate in the upper and lower lift blocks. The manner in which the concentric shafts 50 and 51 of the lift mechanism 48 are rotatably supported to permit rotation of the associated indexing head is conventional, but two such support mechanisms are provided, one for supporting the shaft 50 of the upper indexing head and one for supporting the shaft 51 of the lower indexing head.

The upper lift block 67 is connected by the bracket 55 and a hydraulic lift cylinder 59 to the upper end of coupling link member 54. The lower end of coupling link member 54 is pivotally connected to drive link member 53 at a location 53c between its ends 53a and 53b. The lower lift block 69 is connected by bracket 57 and a hydraulic lift cylinder 59a to the upper end of coupling link member 58. The lower end of coupling link member 58 is pivotally connected to drive link member 53 at a location 53d between its ends 53a and 53b. The end 53a of drive link member 53 is pivotally connected to the mold clamping mechanism bridge 32 and end 53b of drive link member 53 is pivotally connected to the lower end 56a of a support rod 56. The upper end of support rod 56 is connected to the undersurface of the frame 25. The hydraulic lift cylinders 59 and 59a provide for set up of the injection blow mold apparatus, enabling the upper and lower indexing head assemblies to be operated manually to permit positioning of the cores and the indexing heads as the molds are being positioned during set up.

The relative speed of travel, and thus the distance travelled by the indexing heads 40 and 44, is established by the location of the pivot points 53c and 53d relative to the ends of the drive link member 53. The concentric rods 50 and 51 have different pivot points 53c and 53d on the pivotally mounted drive link member 53 which provide different speeds of travel for the indexing head assemblies 38 and 39 as the indexing head assemblies are moved vertically up and down during opening and closing of the molds. In providing simultaneous opening and closing of the lower and upper molds 16 and 18, the lower indexing head assembly 38 and the upper indexing head assembly 39 are moved vertically at different speeds during opening and closing of the molds in a manner similar to the movement of the upper and common shoes which move the mold portions to open and close the molds. The upper indexing head assembly 39 moves faster than the lower indexing head assembly 38 so that the upper indexing head assembly travels further than the lower indexing head assembly during opening and closing of the molds. The length of the link member 53 and the location of the points 53c and 53d of connection of the rods 50 and 51, respectively, to the link member 53 are selected so that the vertical movement of the indexing heads and of the cores carried thereby is coordinated with the vertical movement of the associated mold portions. Consequently, the respective indexing heads move one-half the "effective" distance of the respective mold portions. This accounts for the common shoe moving along with the upper shoe, and thus, the lower indexing head moving along with the upper indexing head. By way of example, when the length of travel S1 for the common shoe 26 is five inches in opening and closing the lower mold 16, the corresponding length of travel T1 of the lower indexing head 44 is two and one-half inches. When the length of travel S2 for the upper shoe is ten inches in opening and closing the upper mold 18, the corresponding length of travel T2 for the upper indexing head 40 is seven and one-half inches. The cores are moved into and out of the blow molds in unison with the cores being moved into and out of the injection molds 16 and 18.

For the purpose of facilitating the injection of hot plastic resin into the upper and lower preform injection molds, the stacked mold assembly 12 includes an upper injection manifold 61 associated with the upper injection mold and a lower injection manifold 62 associated with the lower injection mold. The manifolds 61 and 62 direct the hot plastic into the preform molds. The upper injection manifold 61 is mounted on the upper surface 26b of the common shoe 26 and is moved with the common shoe 26. Similarly, the lower injection manifold 62 is mounted on the lower surface 26a of the common shoe 26 and is moved with the common shoe 26. The upper and lower manifolds 61 and 62 each include nozzles 61a and 62a, respectively, which meter the flow of plastic material into the preform mold. The nozzles 61a and 62 and mounted on suitable nozzle blocks which hold the nozzles in place during the injection molding process as is known in the art. The upper and lower injection manifolds are supplied by a flow divider 63 which communicates with the injection nozzle assembly 64 of an extruder apparatus (not shown).

The flow divider 63 comprises a vertically extending hollow tube which is communicated at its lower end with the outlet of the injection nozzle assembly 64 and is communicated along its vertical length with the inlets of the upper and lower manifolds. With this arrangement, the injection nozzle assembly 64 can be mounted on the fixed lower shoe 24 because the injection nozzle assembly 65 does not have to be moved horizontally in and out relative to the flow divider and/or the movable common shoe 26 during the portions of the molding cycle when the shoes are raised to open the molds. The flow divider 63 includes an indexing means 65 at its lower end which cooperates with a receptor 66 on the upper surface of the injection nozzle assembly 64 to turn on a valve at the outlet of the injection nozzle assembly 64 only when the injection molds are closed. The hot plastic resin is injected into the upper and lower manifolds 61 and 62 and though individual nozzle tips 61a and 62a into the cavities of the preform injection molds 16 and 18.

In operation of the injection blow molding apparatus, it is assumed initially that the preform injection molds 16 and 18 are in the open position as illustrated in FIG. 2. The clamping mechanism of the injection blow molding apparatus 10 operates, moving the clamping bridge downwards to the position represented by dashed lines. The tie rod bars 30 are moved downward as the clamping bridge moves downwardly, so that the upper shoe 28 is moved downwardly. Additionally, the drive links 33 are pivoted counterclockwise about ends 33a, moving the pushrods 31 downwardly, so that the common shoe 26 is moved downwardly. The common shoe 26 moves downward a distance S1 until the lower limit of travel is reached for the common shoe at the position represented by the dashed lines. The upper shoe 28 moves downward a distance S2 until the lower limit of travel is reached for the upper shoe at the position represented by the dashed lines. At this position for the upper and the common shoes, the upper portion 21 of the lower mold 16 is at the closed position for the upper mold on the lower portion of the lower mold and the upper portion 23 of the upper mold 18 is at the closed position for the upper mold on the lower portion 22 of the upper mold. Because of the linkage which couples the common shoe 26 to the injection clamping bridge, the common shoe 26 has moved only five inches while the upper shoe 28 has moved ten inches.

Simultaneously with the downward movement of the upper and lower shoes, the drive link member 53 is pivoted clockwise about pivot pin 56b, moving the rods 50 and 51 downwardly, lowering the rotating indexing heads 40 and 44 to move the cores into the upper and lower molds, respectively. Because of the relative positioning of the connections of the rods 50 and 51 on the linkages, the upper indexing head 40 moves seven and one-half inches while the lower indexing head 44 moves two and one-half inches. Simultaneously with the closing of the upper and lower injection molds, the upper and lower blow molds are being closed.

After the preform injection molds and the blow molds have been closed and clamped through the operation of the injection mold clamping mechanism, the valve operate mechanism of the injection nozzle assembly 64 is in registry with the inlet of the flow divider, permitting hot plastic resin to be injected from the injection nozzle assembly 64 through the hollow tube of the flow divider 63 and into the upper and lower injection manifolds. The plastic material flows though the injection manifolds and out from the individual nozzle tips 61a and 62a into the cavities of the preform injection molds where the exact amount of material needed to form the preforms is injected around cores located in the mold cavities.

Then, the reverse sequence of operations is carried out to open the preform injection molds. That is, the injection clamping mechanism is operated to raise the tie rod bars 30, moving the upper shoe 28 vertically upwards the distance S2 and off the lower portion of the upper mold. In addition, the link members 33 are pivoted clockwise, moving the pushrods 31 upwardly to lift the common shoe 26. This causes the upper portion of the lower mold to be moved vertically upwards the distance S1 and to be lifted off the lower portion of the lower mold. As the tie rod bars 30 are raised by the injection mold clamping mechanism, the link member 53 is pivoted counterclockwise, raising the pushrods 50 and 51 to lift the upper and lower indexing heads out of the upper and lower molds, respectively, as the upper and lower molds are being opened. When the upper and common shoes reach their upper travel limits, the cores have been raised sufficiently by the indexing heads 40 and 44 to clear the molds so as to permit rotation of the indexing heads to the next station.

Then, the indexing heads index the cores carrying the injected preforms 120° to the blow molds at the blow station II. The blow molds are closed in a manner similar to that described with reference to the injection mold operation. The cores carrying the preforms are lowered into the cavities of the blow molds as the blow molds are being closed. When the blow molds are closed, the preforms positioned within the cavities of the blow molds are blown to the final shape for the hollow articles being produced by air injected into the interior of the preforms through the cores as is known in the art. Then, the blow molds are opened and the cores carrying the articles are lifted out of the blow molds. The indexing heads are rotated to index the cores carrying the finished articles 120" to the eject station III where the articles are ejected by a suitable ejection mechanism, such as stripper bars (not shown), either directly off the cores or into a transfer unit for orientation on a conveyor. In this multi-station type of equipment, one set of preforms is being molded at the preform injection mold station I while another set of preforms is being blown at the blow station II and a set of formed articles is being removed from the injection blow molding apparatus 10 at the eject station III.

Figure 3:
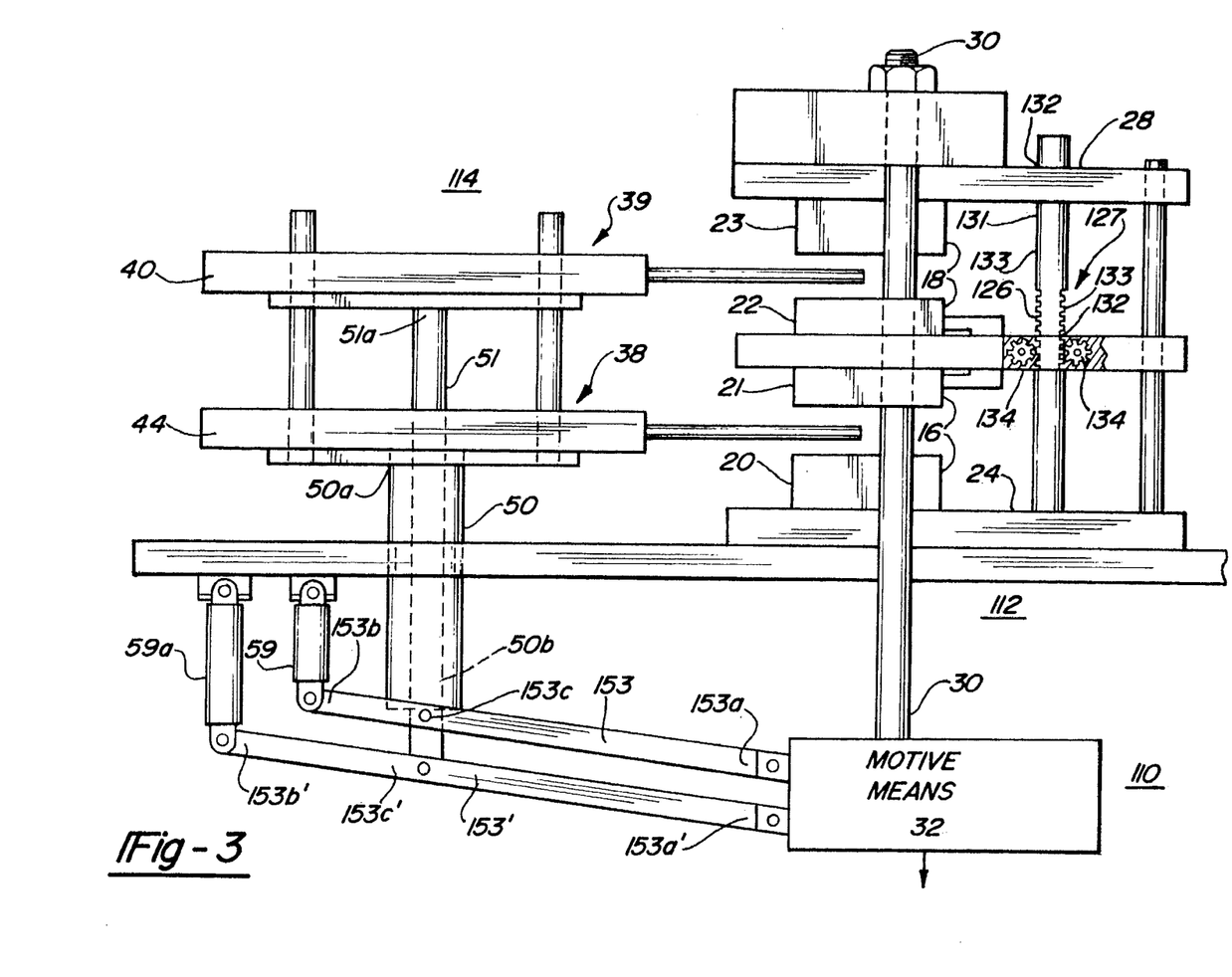
FIG. 3 is a simplified representation of another embodiment of the injection blow molding apparatus including a stacked mold arrangement provided by the present invention, the apparatus having a direct drive arrangement which provides simultaneous opening and closing of the stacked molds; and, FIG. 4 is a simplified representation of a further embodiment of an injection blow molding apparatus including a stacked mold arrangement provided by the present invention, the apparatus having a drive arrangement which provides sequential opening and closing of the stacked molds.

FIG. 3 is a simplified representation of a stacked mold assembly 112 and an indexing mechanism 114 for a further embodiment of an injection blow molding apparatus 110 provided by the present invention. The injection blow molding apparatus 110 is a multi-station apparatus and is similar to the injection blow molding apparatus 10 shown in FIGS. 1 and 2, but includes different drive arrangements for the molds and the indexing heads. Accordingly, like elements have been given the same reference numerals and similar elements have been given a reference numeral which is "one hundred" greater than the numeral used in FIGS. 1 and 2.

The stacked mold assembly 112 includes a lower mold 16 and an upper mold 18 which open simultaneously and which close simultaneously. The lower mold 16 has a lower mold portion 20 and an upper mold portion 21 and the upper mold 18 has a lower mold portion 22 and an upper mold portion 23. The lower and upper molds are shown in the open position in FIG. 3. Mold portion 20 is mounted on fixed lower shoe 24. Mold portion 23 is mounted on movable upper shoe 28. Mold portions 21 and 22 are mounted on movable common shoe 26 which is located between the upper shoe and the lower shoe.

The upper shoe 28 is moved vertically by tie rod bars 30 which are driven by the mold clamping mechanism of the injection blow molding apparatus. The common shoe 26 is mechanically coupled to the upper shoe 28 by a drive mechanism 127 to provide relative movement between the upper and lower mold portions of the upper and lower molds in response to operation of the mold clamping mechanism. The injection blow molding apparatus provides for simultaneous opening (and closing) of the lower and upper molds 16 and 18. Like the embodiment described with reference to FIGS. 1 and 2, the upper shoe is moved twice the distance that the common shoe is moved in moving the mold portions between open and closed positions. The opening and closing of the blow mold at the blow station is done in a manner similar to that in which the stacked mold assembly 112 is operated between open and closed positions.

The drive mechanism 127 includes a direct drive gear arrangement, such as a rack and pinion, which couples the common shoe 26 to the tie rod bar 30 adjacent to the common shoe. A pair of rods, such as rod 131 carried by the upper shoe extend through respective apertures 132 in the common shoe 26 and have shaft portions including a rack defined by notches or teeth 133 which mesh with the teeth 135 of pinions 134 carried by the common shoe 26. As the upper shoe 28 is lifted by the tie rod bar 30, the rods 131 are moved vertically upwards, causing the common shoe to be moved upwards. The gear ratio provided by the teeth 133 of the rack and the teeth 135 of the pinions 134 is selected to cause the common shoe to move half the distance that the upper shoe moves in opening or closing of the molds.

The indexing mechanism 14 includes a lower indexing head assembly 38 associated with the lower mold 16 and an upper indexing head assembly 39 associated with the upper mold 18 which are identical with the indexing head assemblies of injection blow molding apparatus 10 and accordingly will not be described in detail. The drive mechanism 148 includes concentric vertically extending rods 50 and 51 but has separate link members 153 and 153' for moving the outer rod 50 and the inner rod 51. The rotatable head 44 of the lower indexing head assembly 38 is supported on the upper end 50a of outer rod 50 which has its lower end 50b connected by drive link 153 to a suitable motive means, such as the mold clamping mechanism of the injection blow molding apparatus. Link 153 has one end 153a pivotally connected to the mold mechanism bridge 32 and its other end 153b connected to manual lift cylinder 59 which is connected to the frame 25. The lower end 50a of rod 50 is connected to the link 153 at a location 153c between the ends 153a and 153b. Similarly, the rotatable head 40 of the upper indexing head assembly 39 is supported on the upper end 51a of inner rod 51 which has its lower end 51b connected by link 153' to the mold clamping mechanism bridge 32. Link 153' has one end 153a' connected to the mold clamping mechanism and its other end 153b' connected to manual lift cylinder 59a. The lower end 51a of the rod 51 is connected to the link 53 at a location 153c' between the ends 153a' and 153b'.

Thus, as the clamping bridge 32 is moved downwardly by the mold clamping mechanism, the tie rods 30 move downward, moving the upper shoe 28 downwardly. As the upper shoe moves downwardly, rack 133 pivots pinions 134, causing the common shoe 26 to move downwardly at a rate which is one-half the rate at which the upper shoe is moving for closing the injection molds. At the same time, the drive links 153 and 153' are pivoting clockwise, moving the rods 50 and 51 downward to lower the cores into the injection molds as the injection molds are closing.

The rods 50 and 51 have different pivot points 153c and 153c' on the pivot levers 153 and 153' which provide different speeds of travel for the indexing head assemblies as the indexing head assemblies are moved during opening and closing of the molds in the manner described above for the indexing assemblies shown in FIGS. 1 and 2.

The vertical movement of the indexing heads and the cores carried thereby is coordinated with the vertical movement of the associated mold portions so that the respective indexing heads move one-half the distance of the respective mold portions in the manner described above with reference to the embodiment shown in FIGS. 1 and 2.

Figure 4:
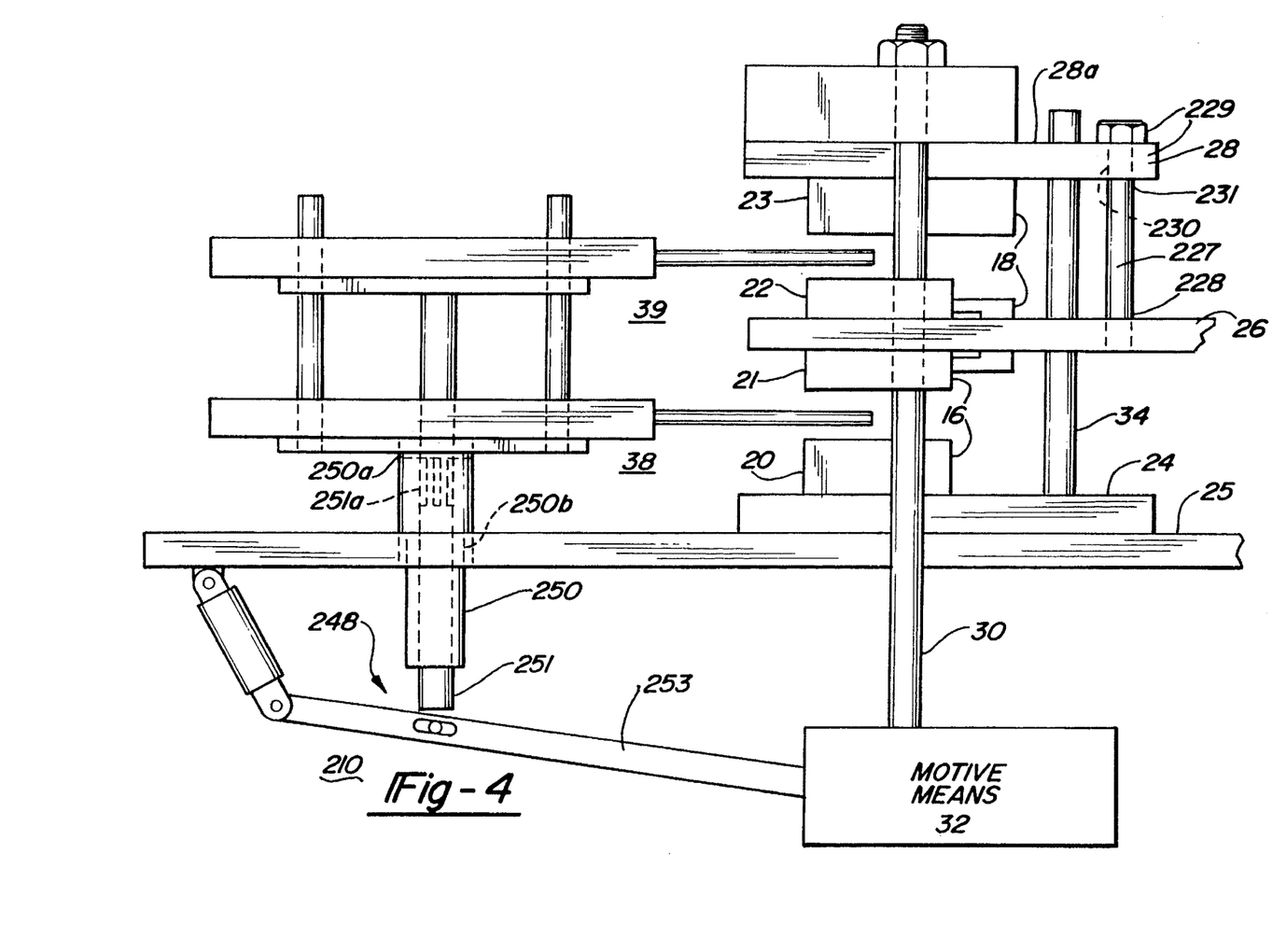

In the embodiment illustrated in FIGS. 1 and 2, the upper and lower molds open simultaneously. In accordance with a further embodiment of a multi-station injection blow molding apparatus 210 which is illustrated in FIG. 4, the upper and lower molds operated to be opened in sequence. The injection blow molding apparatus 210 is similar to the injection blow molding apparatus 10 shown in FIGS. 1 and 2, and accordingly, like elements have been given the same reference numerals and similar elements have been given a reference numeral which is "two hundred" greater than the numeral used in FIGS. 1 and 2.

Referring to FIG. 4, the coupling mechanism 27 of the embodiment shown in FIGS. 1 and 3 is replaced by headed leader pins 227 having their lower ends 228 secured to the common shoe 26 and their headed upper ends 229 passing through bushings 230 located in apertures 231 in the upper shoe 28.

The upper and lower molds are shown in their open positions in FIG. 4. In the open position, the common shoe 26 is suspended from the upper shoe 28 by the leader pins 227. To close the molds, the tie rod bars 30 are moved downwards by a suitable motive means 32, such as a bridge 32 connected to the injection mold clamping mechanism, moving the upper shoe downwards. As the upper shoe 28 is moved downwards, the common shoe 26 is lowered until the upper mold portion 21 of the lower mold 16 engages the lower mold portion 20 of the lower mold. At this position, the lower mold 16 is closed and further downward movement of the common shoe is prevented by the engagement of the upper mold portion 21 with the lower mold portion 20. However, the upper shoe continues its downward movement until the upper mold portion 23 engages the lower mold portion 22, which position may be defined by a travel limit means of the clamping bridge 32.

The reverse operation is carried out to open the molds. During opening of the upper and lower molds, initially, the upper shoe 28 is lifted by the tie rod bars 30 which are raised or extended by injection mold clamping bridge 32. The tie rod bar moves the upper mold portion 23 of the upper mold 18 vertically upwards relative to the lower mold portion 22 of the upper mold 18, opening the upper mold 18, while the upper portion 21 of the lower mold 16, which is mounted on common shoe 26, remains in position on the lower mold portion 20 so that initially the lower mold 16 remains closed. When the upper shoe 28 is lifted to the point of contact between the heads 229 of the leader pins 227 and the upper surface 28a of the upper shoe 28, continued vertical movement of the upper shoe will result in the common shoe 26 being lifted by the upper shoe 28, carrying with it the upper portion of the lower mold 21, opening the lower mold 16. This operation can be accomplished in other ways, such as by securing the leader pins 227 to the upper shoe 28 and sliding though the common shoe 26 or by providing an inwardly directed extension member carried by the tie bar rods 30 that contacts and lifts the common shoe 26 at the proper time as the upper shoe 28 is raised during opening of the upper mold.

The drive mechanism 248 for the indexing head assemblies 38 and 39 includes concentric rods 250 and 251. The inner rod 251 is connected by drive link 253 to the clamping bridge 32 of the injection mold clamping mechanism. The outer rod 250 has an inner flange 250a which is adapted to be engaged by a splined portion 251a of the inner rod 251 as the inner rod is moved vertically upwards. The outer shaft 250 has a reduced diameter portion 250b which defines a lower travel limit stop for the rod 250 by engaging the upper surface of the frame 25 which locates the lower indexing head assembly in the proper position relative to the lower mold 16. When the tie bar rod 30 is raised, the link 253 is pivoted counterclockwise. Thus, as the indexing head assemblies are raised during opening the molds, initially, only the upper indexing head assembly 39 is lifted by the inner rod 251 in the proper relationship relative to the upper injection mold 18 until the desired opening is obtained. At that time, which coincides with the time that the leader pins 227 begin to lift the common shoe 26, the splined portion 251a of the inner shaft 251 engages the flange 250a of the outer shaft 250 and the inner shaft 251 starts to lift the outer shaft 250 and the lower indexing head assembly which is connected to the outer shaft 250. As the indexing head assemblies are being lowered during closing of the molds the time that the common shoe is moving downwards, the inner rod 251 and the upper indexing head 39 carried thereby are moved downwardly. The outer rod 250 initially is carried by the inner rod 251 and is also being moved downwardly. When the outer rod reaches its lower travel limit stop, further downward movement of the outer shaft 250 is prevented and thus, the splined portion 251*a* of the inner shaft becomes disengaged from the flange 250*a*. The inner shaft 251 continues its downward movement until the clamping mechanism reaches its lower limit of travel. At this time, the upper shoe 28 has been lowered to a position where the upper mold portion 23 engages the lower mold portion 22, closing the upper mold.

Thus, it can be seen that the present invention has provided an injection blow molding apparatus which includes a stacked mold arrangement which is particularly suitable for use in a multi-station apparatus. In accordance with a disclosed embodiment, the apparatus includes stacked injection blow molds at a first station, stacked blow molds at a second station and upper and lower core bearing indexing heads which are rotatable in a horizontal plane. The cores cooperate with the upper and lower injection molds for producing preforms at two levels at the first station and cooperate with the upper and lower blow molds at the second location for expanding the preforms at two levels to form hollow articles. In accordance with one embodiment of the invention, the stacked molds are adapted to be opened and closed substantially simultaneously. Simultaneous opening of the molds is accomplished by mechanically coupling the common support to the motive means in such a way that the common support travels slower than the upper support, compensating for the movement of the common support relative to the upper support. In addition, the upper and lower indexing heads are coupled to the motive means in manner as to enable the cores to be moved vertically relative to the molds in correspondence with the movement of the molds and to be moved at different rates which are correlated with the rates at which the upper support and the common support are being moved. In accordance with another embodiment, the common support is coupled to the upper support by headed leader pins which enable the upper mold and the lower mold to be opened and closed in sequence. In both of the exemplary arrangements, the upper and lower molds are disposed in a vertically stacked arrangement and the upper mold and the lower mold are clamped closed by a common clamping mechanism during molding operations. However, it is within the scope of the present invention that the stacked molds can be oriented in a horizontal stacked arrangement and driven horizontally by the drive and coupling mechanism. In either orientation of the stacked molds and drive and coupling mechanism, the mold capacity for the injection blow molding apparatus is doubled without an increase in the clamping tonnage for the molds.

We claim:

1. An an apparatus for injection blow molding hollow plastic articles, said apparatus having a stacked mold arrangement comprising:

a first mold having mating first and second mold portions adapted for relative movement between closed and open positions, said mold portions of said first mold defining at least one mold cavity when at said closed position and being spaced apart when at said open position;

a second mold having mating first and second mold portions adapted for relative movement between closed and open positions, said mold portions of said second mold defining at least one mold cavity when at said closed position and being spaced apart when at said open position;

first support means supporting said second mold portion of said first mold; second support means supporting said first mold portion of said second mold;

common support means located between said first support means and said second support means, said common support means supporting said first mold portion of said first mold in operative relationship with said second mold portion of said first mold and supporting said second mold portion of said second mold in operative relationship with said first mold portion of said second mold;

and drive means for moving said second support means in one direction relative to said common support means to open said second mold and for moving said second support means in an opposite direction relative to said common support means to close said second mold; and coupling means coupling said common support means to said drive means in a manner as to cause said first mold to be opened and closed as said second mold is opened and closed, respectively, said drive means including first means coupled to said second support means for moving said second support means relative to said common support means to thereby move said first mold portion of said second mold relative to said second mold portion of said second mold, and said coupling means including second means causing said common support means to be moved relative to said first support means at a rate which is different from the rate at which said second support means is moved to enable said first support means and said common support means and the mold portions supported thereby to be moved different distances in a given interval of time.

2. An apparatus for injection blow molding hollow plastic articles said apparatus having a stacked mold arrangement comprising:

a first mold having mating upper and lower mold portions adapted for relative vertical movement between closed and open positions, said mold portions of said first mold defining at least one mold cavity when at said closed position and being spaced apart when at said open position;

a second mold having mating upper and lower mold portions adapted for relative vertical movement between closed and open positions said mold portions of said second mold defining at least one mold cavity when at said closed position and being spaced apart when at said open position;

supporting means supporting said upper mold portion of said first mold in overlying relationship with said lower mold portion of said first mold and supporting said lower mold portion of said second mold in underlying relationship with said upper mold portion of said second mold;

drive means for simultaneously moving said upper mold portion of said first mold vertically in one direction relative to said lower mold portion of said first mold and moving said upper mold portion of said second mold vertically in said one direction relative to said lower mold portion of said second mold in a manner as to cause said first and second molds to be opened substantially simultaneously, said supporting means including first movable support means supporting said upper mold portion of said first mold and said lower mold portion of said second mold and second movable support means supporting said upper mold portion of said second mold;

and coupling means coupling said first support means to said drive means in a manner as to cause said first support means to be moved at a rate which is different than the rate at which said second support means is moved to thereby enable said first and second support means and the mold portions supported to be moved different distances during a given interval of time.

3. Apparatus according to claim 2, wherein said drive means is operable to simultaneously move said upper mold portion of said first mold vertically in the opposite direction relative to said lower mold portion of said first mold and said upper mold portion of said second mold vertically in the opposite direction relative to said lower mold portion of said second mold in a manner as to cause said first and second molds to be closed substantially simultaneously.

4. Apparatus according to claim 2, wherein said coupling means includes means for causing said first support means to be moved more slowly than said second support means, permitting said second support means to move further than said first support means in a given time interval.

5. Apparatus according to claim 2, including fixed support means supporting said lower mold portion of said first mold; said first support means being located between said fixed support means and said second support means and supporting said upper mold portion of said first mold in overlying relationship with said lower portion of said first mold and supporting said lower mold, portion of said second mold in underlying relationship with said upper mold portion of said second mold; said drive means being connected to said second support means for moving said second support means relative to said first support means to thereby move said upper mold portion of said second mold relative to said lower mold portion of said second mold.

6. Apparatus according to claim 5, wherein said coupling means includes an elongated, vertically extending member having an upper end and a lower end, said member being connected to said first support means near said upper end, and means connecting said drive means to said member near said lower end to enable said first support means to be moved by said drive means when said second support means is being moved.

7. Apparatus according to claim 5, wherein said first and second molds comprise injection molds, and further including first core means having at least one core cooperating with said first mold to produce preforms and second core means having at least one core cooperating with said second mold to produce preforms, first indexing means supporting said first core in operative relation with said first mold, second indexing means supporting said second core in operative relation with said second mold, and further coupling means coupling said first and second indexing means to said drive means to enable said first and second cores to be moved vertically relative to said first and second molds in correspondence with the movement of said first and second support means.

8. Apparatus according to claim 7, wherein said further coupling means includes means for moving said first and second indexing means at different rates.

9. Apparatus according to claim 5, wherein said first and second molds are blow molds, and including first and second core means each including at least one core cooperating with said first and second molds, respectively, to expand said preforms to form hollow articles, first indexing means supporting said first core in operative relation with said first mold, second indexing means supporting said second core in operative relation with said second mold, and further coupling means coupling said first and second indexing means to said drive means to enable said first and second cores to be moved vertically relative to said first and second molds in correspondence with the movement of said first and second support means.

10. Apparatus according to claim 9, wherein said further coupling means includes means for moving said first and second indexing means at different rates.

11. An apparatus for injection blow molding hollow plastic articles, said apparatus having a stacked mold arrangement comprising:

a first mold having mating upper and lower mold portions adapted for relative vertical movement between closed and open positions, said mold portions of said first mold defining at least one mold cavity when at said closed position and being spaced apart when at said open position;

a second mold having mating upper and lower mold portions adapted for relative vertical movement between closed and open positions said mold portions of said second mold defining at least one mold cavity when at said closed position and being spaced apart when at said open position;

lower support means supporting said lower mold portion of said first mold;

upper movable support means supporting said upper mold portion of said second mold;

common movable support means located between said lower support means and said upper support means, said common support means supporting said upper mold portion of said first mold in overlying relationship with said lower portion of said first mold and supporting said lower mold portion of said second mold in underlying relationship with said upper mold portion of said second mold;

drive means coupled to said upper support means for moving said upper support means vertically in one direction to open said second mold and for moving said upper support means vertically in an opposite direction to close said second mold;

and coupling means coupling said common support means to said drive means to cause said common support means to be moved along with said upper support means vertically in said one direction to open said first mold when said upper support means is moved in said on direction, and to cause said common support means to be moved along with said upper support means vertically in said opposite direction to close said first mold when said upper support means is moved is said opposite direction, whereby said first mold in opened and closed as said second mold is opened and closed, respectively.

12. An apparatus for injection blow molding hollow plastic articles, said apparatus having a stacked mold arrangement comprising:

a first mold having mating upper and lower mold portions adapted for relative vertical movement between closed and open positions, said mold portions of said first mold defining at least one mold cavity when at said closed position and being spaced apart when at said open position;

a second mold having mating upper and lower mold portions adapted for relative vertical movement between closed and open positions for said second mold, said mold portions of said second mold defining at least one mold cavity when at said closed position and being spaced apart when at said open position;

lower support means supporting said lower mold portion of said first mold;

upper movable support means supporting said upper mold portion of said second mold;

common movable support means located between said lower support means and said upper support means, said common support means supporting said upper mold portion of said first mold in overlying relationship with said lower portion of said first mold and supporting said lower mold portion of said second mold in underlying relationship with said upper mold portion of said second mold;

drive means for moving said upper support means vertically in one direction relative to said common support means to open said second mold and for moving said upper support means vertically in an opposite direction relative to said common support means to close said second mold;

said drive means including first means coupled to said upper support means for moving said upper support means relative to said common support means to thereby move said upper mold portion of said second mold relative to said lower mold portion of said second mold; and coupling means coupling said common support means to said drive means in a manner as to cause said first mold to be opened and closed as said second mold is opened and closed, respectively, said coupling means including second means for causing said common support means to be moved at a rate which is different from the rate at which said upper support means is moved to enable said upper support means and said common support means and the mold portions supported thereby to be moved different distances in a given interval of time.

13. Apparatus according to claim 12, wherein said coupling means causes said common support means to be moved relative to said lower support means, whereby said upper mold portion of said first mold is moved relative to said lower mold portion of said first mold simultaneously with the moving of said upper portion of said second mold by said drive means relative to said lower mold portion of said second mold.

14. Apparatus according to claim 12, wherein said second means includes coupling means connected between said first means and said common support means for causing said common support means to be moved more slowly than said upper support means, whereby said upper support means moves further than said common support means in said given time interval.

15. A multi-station apparatus for injection blow molding hollow plastic articles, said apparatus including injection molding means at a first station, blow molding means at a second station, and indexing head means rotatable in a horizontal plane and having a plurality of cores cooperating with said injection molding means for producing preforms at said first station and for moving said preforms to said second station, said cores cooperating with said blow molding means at said second location for expanding said preforms to form said hollow articles, and said cores moving said hollow articles to a third station for ejection from said apparatus, said apparatus further including a stacked mold arrangement comprising:

first and second molds at one of said stations, said first mold having mating upper and lower mold portions adapted for relative vertical movement between closed and open positions, said mold portions of said first mold defining at least one mold cavity when at said closed position and being spaced apart when at said open position;

said second mold having mating upper and lower mold portions adapted for relative vertical movement between closed and open positions, said mold portions of said second mold defining at least one mold cavity when at said closed position and being spaced apart when at said open position; movable support means supporting said upper mold portion of said first mold in overlying relationship with said lower portion of said first mold and supporting said lower mold portion of said second mold in underlying relationship with said upper mold portion of said second mold;

drive means for moving said upper mold portion of said second mold vertically relative to said lower mold portion of said second mold and for moving said upper mold portion of said first mold vertically relative to lower mold portion of said first mold.

16. Apparatus according to claim 15, including fixed support means supporting said lower mold portion of said first mold; and second movable support means supporting said upper mold portion of said second mold, said second movable support means being coupled to said drive means and being movable thereby; said first-mentioned mentioned movable support means being located between said fixed support means and said second movable support means.

17. Apparatus according to claim 16, wherein said drive means includes first means coupled to said second support means for moving said second support means relative to said first support means to thereby move said upper mold portion of said second mold relative to said lower mold portion of said second mold; and second means causing said first support means to be moved at a rate which is different from the rate at which said second support means is moved to enable said first and second support means and the mold portions supported thereby to be moved different distances in a given interval of time.

18. Apparatus according to claim 17, wherein said second means includes coupling means connected between said first means and said first support means for causing said first support means to be moved more slowly than said second support means whereby said second support means moves further than said first support means in said given time interval.

19. Apparatus according to claim 18, wherein said coupling means includes an elongated, vertically extending member having an upper end and a lower end, said member being connected to said first support means near said upper end, and pivot means connecting said drive means to said member near said lower end, to enable said first support means to be moved by said drive means when said second support means is being moved.

20. Apparatus according to claim 18, wherein said indexing head means comprises a first rotatable indexing head which supports a first plurality of said cores in operative relation with said first mold and a second rotatable indexing head which supports a second plurality of said cores in overlying relation with said first indexing head and in operative relation with said second mold, and further coupling means coupling said first and second indexing heads to said drive means to enable said first plurality of cores and said second plurality of cores to be moved vertically relative to said first and second molds, respectively, in correspondence with the movement of said first and second support means.

21. Apparatus according to claim 20, wherein said further coupling means comprises first and second concentric rods each having an upper end and a lower end, said first rod having its upper end connected to said first indexing head and said second rod having its upper end connected to said second indexing head, and a link having a first end connected to said drive means and a second end pivotally connected to a pivot means, said lower end of said first rod being connected to said link at a first connection point between said first and second ends and said lower end of said second rod being connected to said link at a second connection point between said first end and said first connection point.

22. Apparatus according to claim 18, wherein said first and second molds comprise first and second injection molds at said first station, and including first and second blow molds at said second station, said first and second blow molds each having mating upper and lower mold portions adapted for relative vertical movement between closed and open positions, and further support means coupled to said drive means, said further support means supporting said mold upper and lower portions in such a way as to enable said first and second blow molds to be opened substantially simultaneously and to be closed substantially simultaneously.

23. Apparatus according to claim 22, wherein said injection molding means comprises extruding means includes an extruder outlet communicating with an outlet of a source of extruded plastic material, a first manifold mounted on said first support means in fluid communication with mold cavities of said upper mold portion of said first injection mold and a second manifold mounted on said first support means in fluid communication with mold cavities of said lower mold portion of said second injection mold, said first and second manifolds being movable with said first support means, and means mounted on said fixed support means for coupling said extruder outlet to inlets of said first and second manifolds.

* * * * *